US008677416B2

(12) United States Patent
Arora (10) Patent No.: US 8,677,416 B2
(45) Date of Patent: Mar. 18, 2014

(54) METHOD, SYSTEM AND SOFTWARE FOR DISPLAY OF MULTIPLE MEDIA CHANNELS

(75) Inventor: Jitesh Arora, Thornhill (CA)

(73) Assignee: ATI Technologies, Inc., Ontario (CA)

( * ) Notice: Subject to any disclaimer, the term of this patent is extended or adjusted under 35 U.S.C. 154(b) by 1381 days.

(21) Appl. No.: 09/908,039

(22) Filed: Jul. 17, 2001

(65) Prior Publication Data

US 2003/0018972 A1    Jan. 23, 2003

(51) Int. Cl.
*G06F 3/00* (2006.01)
*G06F 13/00* (2006.01)
*H04N 5/445* (2011.01)

(52) U.S. Cl.
USPC .................. 725/48; 725/37; 725/38; 725/39; 725/44; 725/45; 725/46; 725/49; 725/59

(58) Field of Classification Search
USPC .................................................. 725/14, 721
See application file for complete search history.

(56) References Cited

U.S. PATENT DOCUMENTS

| 5,161,019 | A | * | 11/1992 | Emanuel | 725/56 |
| 6,088,722 | A | * | 7/2000 | Herz et al. | 709/217 |
| 6,177,931 | B1 | * | 1/2001 | Alexander et al. | 725/52 |
| 6,295,646 | B1 | * | 9/2001 | Goldschmidt et al. | 725/41 |
| 6,342,900 | B1 | * | 1/2002 | Ejima et al. | 345/698 |
| 6,400,378 | B1 | * | 6/2002 | Snook | 715/716 |
| 6,445,306 | B1 | * | 9/2002 | Trovato et al. | 340/825.24 |
| 6,718,552 | B1 | * | 4/2004 | Goode | 725/95 |
| 6,725,215 | B2 | * | 4/2004 | Yamamoto | 707/3 |
| 6,993,782 | B1 | * | 1/2006 | Newberry et al. | 725/39 |
| 7,185,355 | B1 | * | 2/2007 | Ellis et al. | 725/46 |
| 2001/0007147 | A1 | * | 7/2001 | Goldschmidt et al. | 717/11 |
| 2002/0009283 | A1 | * | 1/2002 | Ichioka et al. | 386/46 |
| 2002/0095689 | A1 | * | 7/2002 | Novak | 725/151 |
| 2002/0124071 | A1 | * | 9/2002 | Proehl et al. | 709/223 |
| 2002/0157109 | A1 | * | 10/2002 | Nakano et al. | 725/110 |
| 2002/0191954 | A1 | * | 12/2002 | Beach et al. | 386/46 |

* cited by examiner

*Primary Examiner* — Justin Shepard (57) ABSTRACT

A method, system, and software for improved display of multiple media channels are disclosed herein. A system may be used to select, independent of direct user input, a subset of a plurality of media channels based on a user's viewing pattern. The system can include one or more media sources, a media processing system, and a display device, as well as a method for its use. The media processing system receives a plurality of media channels from the one or more media sources. One or more attributes associated with each media channel are compared with a user's viewing pattern determined independent of direct user input by the media processing system. A surf list is generated from the plurality of media channels, where the surf list includes a subset of the plurality of media channels having one or more attributes that are congruent with the user's viewing pattern. A portion, such as a still image, of each media channel in the surf list is output to an output device, such as a display device or storage device. The portions can be displayed simultaneously in a grid on the screen of the display device; the portions can be displayed individually in sequence; or displayed using a combination thereof.

31 Claims, 5 Drawing Sheets

| Seq. 401 | Channel # 402 | Custom Field 404 |
|---|---|---|
| 1 | 026 | None |
| 2 | 004 | Sound On |
| 3 | 014 | 2X Refresh |
| 4 | 101 | Black&White |

Surf List
441

FIG. 4

| Channel # 402 | Custom Field 404 | Seq. 401 |
|---|---|---|
| 001 | None | 3 |
| 002 | Sound On | X |
| 003 | 2X Refresh | 1 |
| 004 | None | X |
| 005 | None | X |
| 006 | Black&White | 2 |

Surf List
442

METHOD, SYSTEM AND SOFTWARE FOR DISPLAY OF MULTIPLE MEDIA CHANNELS

FIELD OF THE DISCLOSURE

The present invention relates generally to multimedia systems and more particularly to the display of multiple media channels.

BACKGROUND

Various devices, such as televisions, set top boxes, and computers, are currently capable of displaying multiple media channels received from a variety of media sources, such as broadcast television, cable television, satellite television, and the Internet. These media channels may be displayed simultaneously or sequentially on a display device. For example, a still image from each media channel input to a television tuner card in a computer may be displayed simultaneously in a grid on a television monitor, thereby allowing a user to preview a number of media channels simultaneously.

Currently, these devices either display all of the media channels, or display the media channels in sequential groups. However, with a large number of media channels, displaying all of the media channels becomes unmanageable since the display resolution of the individual media channels may be inadequate. Likewise, if the media channels are displayed in sequential groups, it often takes an undesirable amount of time to cycle back to the media channels of interest to the user. Alternatively, the user could directly indicate which media channels are to be displayed. However, this becomes a time consuming process when the number of media channels is relatively large. Additionally, the amount of effort needed to directly select the media channels desired by a user often results in the user foregoing the step of directly selecting media channels, likely resulting in the undesirable situation where all of the media channels are displayed.

Given these limitations, as discussed, it is apparent that a way to reduce the effort required by a user to display multiple desired media channels would be advantageous.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

In accordance with at least one embodiment of the present invention, a set of media channels is selected independent from explicit input from a user, where the set of media channels is selected from a plurality of media channels based on an attribute associated with each media channel of the plurality of media channels. A portion of each media channel of the subset of media channels is provided to an output device. An advantage of this embodiment is that less effort to display multiple media channels is required from a user. Another advantage is that those media channels having attributes preferred by a user are more likely to be displayed.

FIGS. 1-5 illustrate a system for improved display of multiple media channels in accordance with a specific embodiment of the present invention having one or more media sources, a media processing system, and a display device, as well as a method for its use. As described in greater detail below, the media processing system receives a plurality of media channels from the one or more media sources. One or more attributes associated with each media channel are compared with a user's viewing pattern determined independent of direct user input by the media processing system. A surf list is generated from the plurality of media channels, where the surf list includes a subset of the plurality of media channels having one or more attributes that are congruent with the user's viewing pattern. In one embodiment, a portion, such as a still image, of each media channel in the surf list is output to the display device. The portions can be displayed simultaneously in a grid on the screen of the display device; the portions can be displayed individually in sequence; or displayed using a combination thereof. Alternately, in another embodiment, a portion of each media channel in the surf list is output to a storage device, such as a hard disk.

Figure 1:
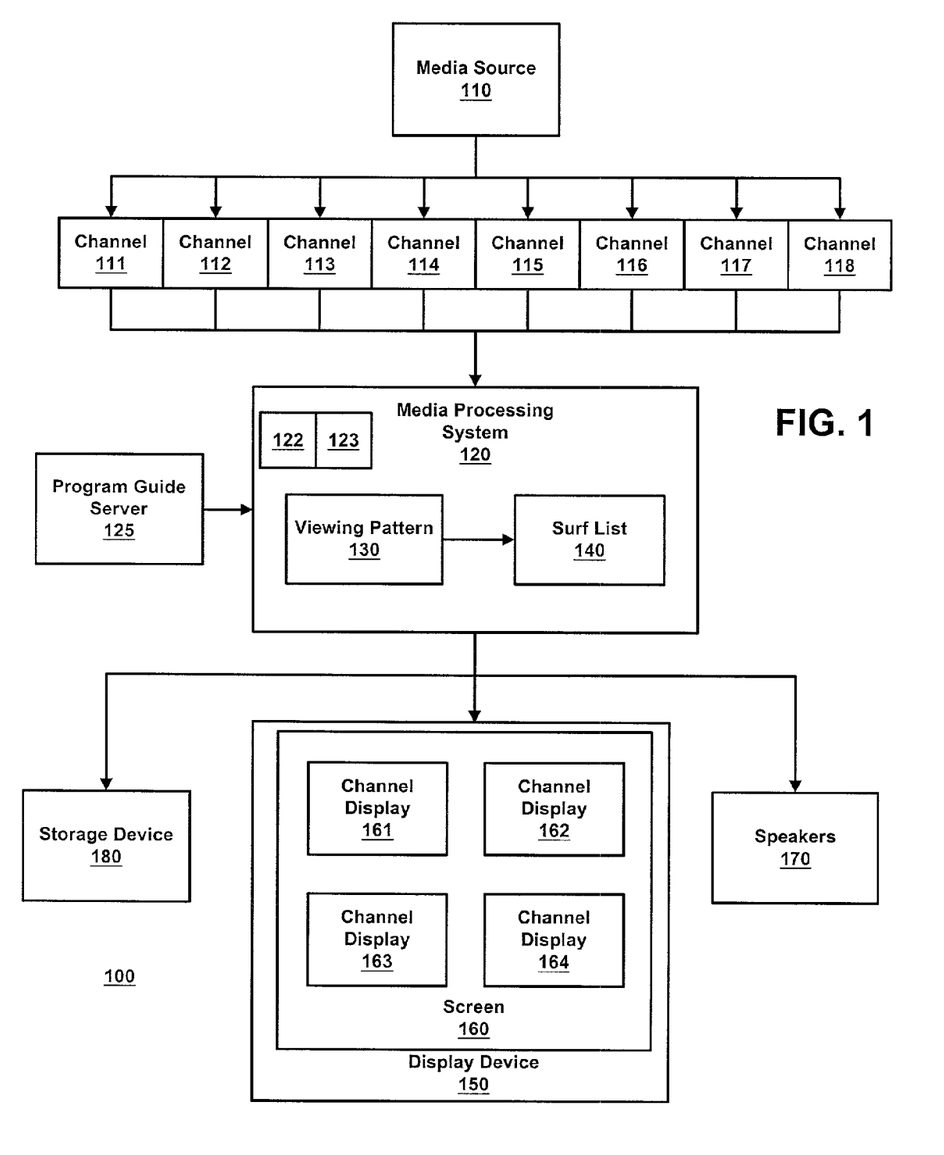
FIG. 1 is a block diagram illustrating a multiple display system according to at least one embodiment of the present invention.

Referring now to FIG. 1, a system for improved display of a plurality of media channels is illustrated according to at least one embodiment of the present invention. System 100 includes one or more media sources 110, media processing system 120 and display device 150. System 100 can further include program guide server 125, speaker 170, and/or storage device 180. Media source 110 can include a variety of sources of media, such as broadcast television, cable television, cable television, the Internet, one or more digital video disc (DVD) players, and the like. Media source 110 also can include a combination of sources of media, such as broadcast television combined with cable television.

Media source 110, in one embodiment, transmits a plurality of media channels 111-118, herein referred to as channels 111-118, to media processing system 120. Channels 111-118 may be transmitted using the Internet, a local area network, a wide area network, a serial connection, a parallel connection, a fiber optic network, a wireless network, and the like. Channels 111-118 can include display channels, such as a video stream associated with a television station or broadcaster, audio channels, such as a frequency modulation (FM) radio station broadcast, data output from a media player, such as a DVD player, media streams received over the Internet, such as a Motion Picture Experts Group (MPEG) video file, and the like. Media source 110 can transmit channels 111-118 to media processing system 120 in parallel, in series, alternating between channels, etc.

Media processing system 120 can include devices capable of processing channels 111-118, such as a desktop computer or a television receiver card connected to the motherboard of a computer, a television, a cable decoder box, and the like. For example, media processing system 120 could include one or more components of a high definition television (HDTV) having a satellite television receiver. As discussed subsequently in greater detail, media processing system 120, in one embodiment, records and/or analyzes one or more users' viewing patterns (viewing pattern 130) to automatically generate a surf list 140 for one or more user without the user's direct input. A user's viewing pattern (viewing pattern 130) can include characteristics of a user's utilization of media processing system 120 and/or channels 111-118, such as the frequency at which a user views a certain channel, the amount of time spent viewing each of channels 111-118, the preferred channel content (such as science-fiction movies), and the like.

In one embodiment, media processing system 120 uses program guide server 125 to obtain additional information necessary to generate surf list 140 from viewing pattern 130. For example, media processing system 120 could determine that a user enjoys watching action movies. Media processing system 120 could obtain content information for each channel 111-118 and place those channels having action content into surf list 140. The attributes of channels 111-118 used to generate surf list 140 can be preset by default, set by a user using a setup menu, as discussed with reference to FIG. 2, and the like. One or more functions of media processing system 120, in one embodiment, are implemented as a set of executable instructions. In this case, these instructions could be stored in memory 122, and then retrieved and executed by processor 123 as necessary. In other embodiments, one or more functions of media processing system 120 can be implemented using a state machine, combinational logic, embedded circuitry, and the like.

Surf list 140, in one embodiment, is used to indicate which channels of channels 111-118 are to be output to display device 160 and displayed on screen 160, as well as how the channels are displayed. For example, surf list 140 could include four channels (channels 111-114) to be displayed on screen 160 simultaneously. In this case, a portion of each of channels 111-114 is displayed in a grid on screen 160 as indicated by surf list 140. In one embodiment, the portion of each channel 111-114 displayed includes a still image. For example, if channels 111-114 are video streams, channel displays 161-164 could include one frame of video from each corresponding channel 111-114 at a given point in time. The portion of each channel 111-114 could also include a video clip, an audio clip, program guide information for the channel, etc. In at least one embodiment, surf list 140 also includes custom properties for channel displays 161-164, such as color/black and white, sound, refresh frequency, and the like. These custom properties may be predetermined by media processing system 120, set by a user, etc. In at least one embodiment, surf list 140 also includes an authentication period, or a "void-by" date. If the authentication period or void-by date of surf list 140 is exceeded, media processing system 120 can consider surf list 140 as void and perform various actions, such as generate a new surf list 140, load another surf list 140, disable operation, and the like.

In other embodiments, channels 111-118 included in surf list 140 could be output to speaker 170 and/or recording device 180. For example, channels 111-118 could include audio streams and media processing system 120, using viewing pattern 130, could determine that channels 111-112 match a user's preferences and place channels 111-112 into surf list 140. Using surf list 140, media processing system 120 could output portions of channels 111-112 to speaker 170, where speaker 170 could alternate between channels 111-112 every given time period, send portions of channel 111 to one speaker 170 and portions of channel 112 to another speaker 170, and so on. Alternately, portions of channels 111-112 could be output to storage device 180, where storage device 180 can include, a recording device such as a compact disc (CD) recorder, a storage device such as a hard disk, and the like. For example, channels 111-118 could include video streams from a plurality of security cameras. Media processing system 120 could determine that channels 114-118 should be placed in surf list 140 (using the time of day, for example). Media processing system 120 could then output still images of channels 114-118 taken every few seconds to a compact disc (CD) recorder (storage device 180). The CD recorder could then store all of the still images of channels 114-118 on a CD for review at a later time. It will be appreciated that the number of media channels to be placed in surf list 140 may be limited by properties of display device 150 (or speaker 170, storage device 180) or limited by a user's preference.

Surf list 140, in one embodiment, allows a user to efficiently preview media channels (media channels 111-118) that are the most relevant, where relevance is determined from the user's viewing pattern (viewing pattern 130). When channels 111-118 listed in surf list 140 are displayed, a user may take a number of actions. For example, a user could use channel displays 161-164 to preview different news shows. When the viewer notices something of interest in one of channel displays 161-164, in one embodiment, the user can select the channel display for full screen viewing. The user can select a channel display (channel displays 161-164) by clicking on it with a mouse, pressing a key on a keyboard, typing a number associated with the desired channel display into an input field, and the like. Likewise, in one embodiment, channel displays 161-164 can refresh at the same or different rates until a user selects a display channel and/or surf list 140 can be updated as the attributes of channels 111-118 change or the user's viewing pattern (viewing pattern 130) changes. It will be appreciated that the display of channels 111-118 referenced by surf list 140 may be used for any appropriate means without departing from the spirit or the scope of the present invention.

Figure 2:
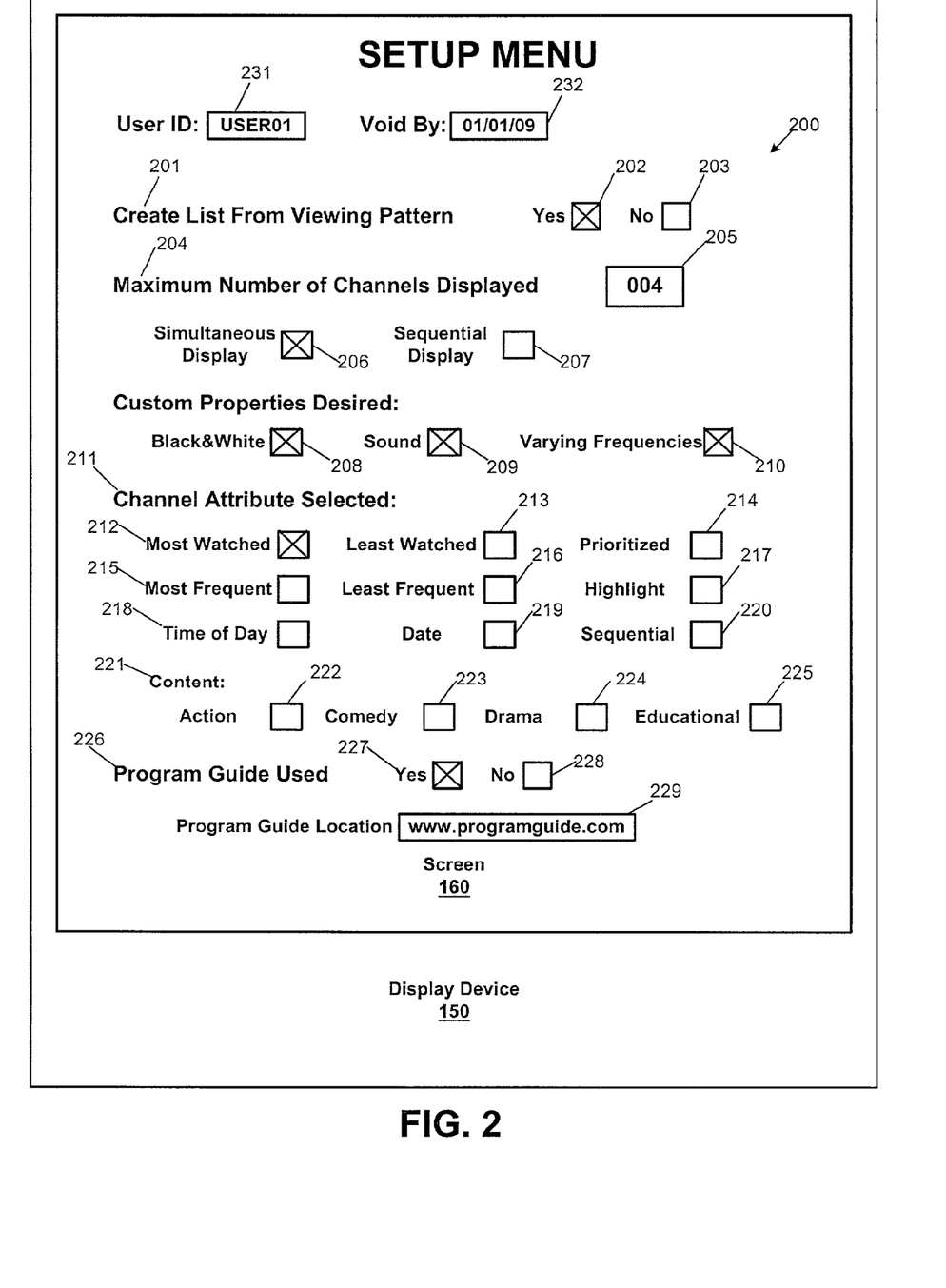
FIG. 2 illustrates a representation of a setup menu according to at least one embodiment of the present invention.

Referring next to FIG. 2, a setup menu is illustrated according to at least one embodiment of the present invention. As mentioned previously, the attributes, or viewing pattern, used to select a subset of channels 111-118 (FIG. 1) for surf list 140 (FIG. 1) can be preset and/or determined by a user. In implementations where the attributes are preset, any number of methods may be used, such as determining attributes based on the properties and specifications of media processing system 120 and/or display device 150 during setup. Alternatively, setup menu 200 can be used in implementations where a user determines some or all of the attributes used to generate surf list 140. It will be appreciated that setup menu 200, as described subsequently, allows a user to select the some or all of the attributes by which channels 111-118 are selected for inclusion in surf list 140 instead of directly selecting individual channels 111-118 for inclusion into surf list 140, thereby saving effort and time on the part of the user. It will be appreciated that although a user can use setup menu 200 to indicate preferences on how the user's viewing pattern (viewing pattern 130) can be analyzed to determine surf list 140, the user does not "explicitly input" the user's channel preferences. The phrase "explicitly input", as used herein, refers to the direct or explicit selection of one or more channels from a plurality of channels (channel 111-118) to be placed or listed in surf list 140. For example, using setup menu 200, a user can define how the user's viewing preferences are to be used to generate surf list 140, but a user does not have to use setup menu 200 to explicitly select certain channels. Note, however, that in at least one embodiment, a user may override or add to the selection of channels 111-118 to be added to surf list 140. For example, a user may indicate that channels added to surf list 140 should include those channels 111-118 that are viewed more frequently than others. However, in this case, the user could also explicitly add one or more channels to the more frequently viewed channels 111-118.

In at least one embodiment, setup menu 200 is displayed on screen 160 of display device 150 for a user's input. For example, setup menu 200 could be displayed during installation of software implementing one or more embodiments disclosed herein. Alternatively, setup menu 200 could be displayed each time a certain event occurs, such as the initiation of a software program or the occurrence of a certain date or day of the week. The user may then enter the user's preferences in the fields (described below) to generate a guide by which media processing system 120 (FIG. 1) generates surf list 140 (FIG. 1).

Setup menu 200 can include viewing pattern enabled field 201, whereby a user can indicate whether a viewing pattern (viewing pattern 130, FIG. 1) is to be generated by selecting yes box 202 or no box 203. If a user selects no box 203, in one embodiment, media processing system 120 defaults to a sequential display of channels 111-118 (FIG. 1), where channels 111-118 are displayed sequentially based on a channel number associated with each channel 111-118. Alternately, selection of no box 203, in one embodiment, could disable all simultaneous or sequential display of multiple channels. In this case, a user likely would have to manually select one of channels 111-118 for display.

If the user selects yes box 202, thereby enabling the generation of viewing pattern 130 (FIG. 1), the user, in one embodiment, can also enter the maximum number of channels (maximum channel field 204) to be displayed either sequentially or simultaneously using maximum channel box 205. For example, in the illustration of setup menu 200 in FIG. 2, a maximum number of four channels has been input into maximum channel box 205. In at least one embodiment, media processing system 120 (FIG. 1) analyzes the properties of display device 150 (FIG. 1). For example, it may be determined that display device 150 has a resolution that will display only a certain number of channels with an adequate resolution. In this case, in one embodiment, media processing system 120 may override the number input into maximum channel box 205 and place the smaller of that number or the certain number determined from display device 150. As mentioned previously, channel displays 161-164 (FIG. 1) can be displayed sequentially or simultaneously. If a user desires simultaneous display, the user can select simultaneous box 206. Likewise, if a sequential display is desired, the user can select sequential box 207.

In at least one embodiment, a number of custom properties may be applied to channels 111-118 (FIG. 1) included in surf list 140 (FIG. 1) and/or the display of those channels on display 150. For example, a user can select black and white box 208 to cause one or more of channel displays 161-164 (FIG. 1) to be displayed in black and white. Likewise, a user could select sound box 209 to turn on or turn off sound for one or more channel displays 161-164. It also may be desirable to refresh some of channel displays 161-164 more frequently at others. For example, if channel display 161 were determined to be a drama show and channel display 162 were determined to be a action movie, it could be more effective if channel display 162 were refreshed at a greater rate than channel display 161, since it may be likely that a drama show has fewer scene changes than an action film. Accordingly, a user could select frequency box 210 to enable or disable multiple refresh rates. It will be appreciated that other appropriate custom attributes may be used without departing from the spirit or the scope of the present invention.

As discussed in greater detail subsequently, in one embodiment, one or more attributes associated with each of channels 111-118 (FIG. 1) are used to determine which of channels 111-118 are to be included in surf list 140 and which are not.

In channel attribute field 211, a user may select one or more of the attributes to be used to generate surf list 140. For example, a user can select most watched box 211 to cause surf list 140 to include those channels 111-118 that are watched the most by the user. Similarly, least watched box 213 may be selected to cause surf list 140 to include those channels 111-118 that are watched the least. Prioritized box 214, in one embodiment, can be selected by the user to cause surf list 140 to include those channels 111-118 with the highest priority values, where the priority value is preset for each channel. Those channels 111-118 that are visited or viewed the most frequently can be selected for inclusion in surf list 140 if the user selects most frequent box 215, or the least frequently can be included if the user selects least frequent box 216. If the user desires to view the major broadcast stations rather than local stations, the user can select highlight box 217. As is often the case with television channels, a certain show is "shown" at the same time every day or every week. In this case, the user can select time of day box 218 to cause the time of day to be used to generate surf list 140 (FIG. 1). Similarly, the day of the week or a date may be an important part of a user's viewing pattern (viewing pattern 130, FIG. 1). In this case, date box 219 may be selected. Sequential box 220 can be selected to affect a sequential display of all channels 111-118. In one embodiment, selecting sequential box 220 is functionally equivalent to selecting no box 203 associated with viewing pattern enabled field 201. A user, in one embodiment, may desire to preview some of channels 111-118 based on the content of the channels. In this case, the user can select one or more content boxes, such as action box 222, comedy box 223, drama box 224, or educational box 225, to indicate content preference. Note that more than one attribute may be selected in many cases. For example, a user could select most watched box 212 and action box 222. In this case, a surf list 140 (FIG. 1) that includes the most watched channels of channels 111-118 that also have action content would be generated.

In at least one embodiment, media processing system 120 relies, at least in part, on information not directly obtainable from a user's viewing pattern (viewing pattern 130, FIG. 1) to generate surf list 140 (FIG. 1). For example, channel content, such as a show type (action, drama, etc), often may not be ascertainable from viewing pattern 140 alone. In this case, media processing system 120 may obtain the necessary information for a variety of sources. In one embodiment, this information is transmitted with each channel 111-118. For example, digital television transmissions often have information pertaining to each channel transmitted. In another embodiment, this information is obtained from an outside source, such as program guide server 125 (FIG. 1). In this case, a user may indicate if a program guide is to be used by selecting yes box 227 associated with program guide field 228, or if not, by selecting no box 228. If a program guide is to be used, a user can enter the location of program guide server 125 by entering an address or location in location box 229. The location can include, but is not limited to, a web address or Internet protocol (IP) address of program guide server 125 or a channel (which can be one of channels 111-118) having program guide information.

In at least one embodiment, viewing attributes or viewing patterns are analyzed for a plurality of users by media processing system 120 (FIG. 1), or one or more user's could have a plurality of viewing patterns associated with the users. Accordingly, in at least one embodiment, setup menu 200 includes user identification field 231. User identification field 231 can be used to load and store user preferences for a plurality of users. For example, user identification field 231 could include a pull-down list containing user names having stored user preferences. When a certain user name is selected in the pull-down list, the associated user preferences are loaded into setup menu 200 for modification. Similarly, setup menu 200 can also include authentication period field 232, or a "void-by" date. A time period or calendar date and/or time could be entered into authentication period field 232. When this time period or date/time have been exceeded, media processing system 120 could void the user preferences displayed in setup menu 200. For example, a soccer fan (a user) could enter user preferences into setup menu 200 that emphasize sports channels at certain times of the day during a World Cup competition. Since the competition is of a finite duration, the soccer fan could enter a specific authentication period, such as seven days, into authentication period field 232. At the end of seven days, media processing system 120 could void the World Cup oriented user preferences and replace them with default user preferences or request new user preferences from the user. Although setup menu 200 has been illustrated having certain attributes and functions to be selected by a user, it will be appreciated that any appropriate attribute of a channel or a user's viewing pattern may be used to generate surf list 140 according to the present invention.

Figure 3:
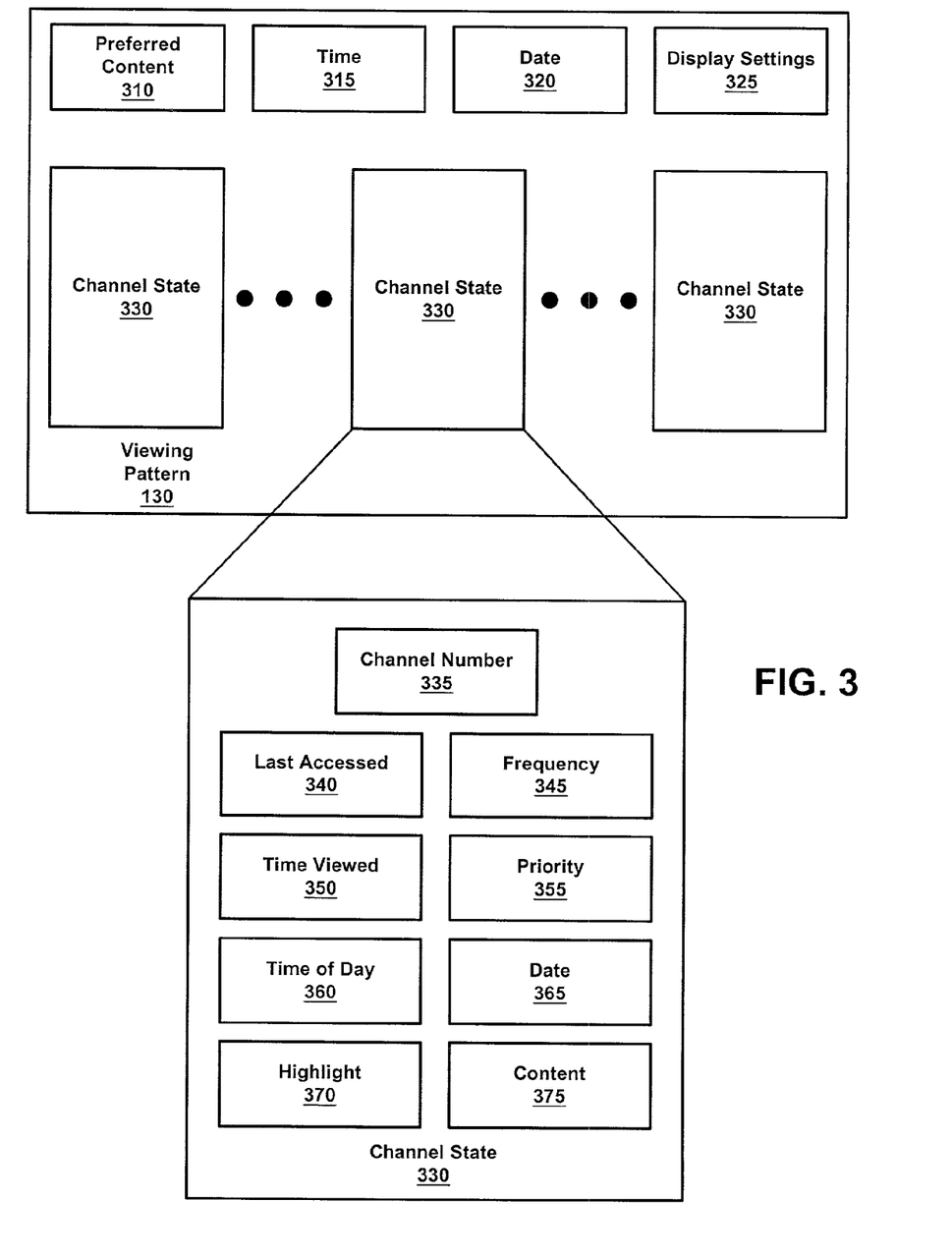
FIG. 3 is a block diagram illustrating a viewing pattern according to at least one embodiment of the present invention.

Referring to FIG. 3, viewing pattern 130 is illustrated in greater detail according to at least one embodiment of the present invention. Viewing pattern 130 includes preferred content field 310, time field 315, date field 320, display settings 325, and a plurality of channel states 330 corresponding to channels 111-118. Viewing pattern 130 can include other fields as appropriate. In one embodiment, viewing pattern 130 is implemented as one or more data structures stored in memory 122 (FIG. 1) or a storage device associated with media processing system 120 (FIG. 2).

As discussed previously, a user's viewing patterns are recorded and/or analyzed for certain characteristics or attributes. In one embodiment, the type or types of channels viewed most often or frequently are stored in preferred content 310. For example, the channels 111-118 viewed the most by a user could include those channels having action content, whereas the next most viewed channels 111-118 could include those channels having comedy content. In this case, a value associated with action content and a value associated with comedy content could be stored in preferred content field 310 in order of preference determined from the user's viewing pattern. A time value, such as the time at which a user is viewing one or more channels 111-118 (FIG. 1), can be recorded in time field 315. Similarly, the date and/or day of the week can be stored in date field 320. Certain display settings preferred by a user, such as the preferred resolution of screen 160 (FIG. 1), color settings, and the like, may be stored in display settings 325.

Channel state 330 of viewing pattern 140 can include, but is not limited to, channel number field 335, last accessed field 340, frequency field 345, time viewed field 350, priority field 355, time of day field 360, date field 365, highlight 370, and/or content field 375. Channel number field 335 can include a channel number assigned to the associated channel (channels 111-118). For example, a television tuner in a certain region may access a certain cable channel by tuning into "channel 40". Last accessed field 340, in one embodiment, includes the time the associated channel was last viewed and/or the amount of time since the channel was last viewed. For example, if a channel (channel 111-118) was last viewed at 4:00.00 PM and it is currently 5:30.00 PM, last accessed field 340 could include the value "4:00.00 PM" and/or "90.00 minutes." Similarly, in one embodiment, the total amount of time the associated channel (channels 111-118) has been viewed since a given point in time or event is stored in time viewed field 350. For example, time viewed field 350 could be cleared at midnight every night. In this case, if a particular channel (channels 111-118) has been viewed for a total of 120 minutes since midnight, a value of 120 minutes would be stored in the associated time viewed field 350 until the channel is viewed again, thereby adding more time, or until midnight passes, at which time viewed field 350 would be reset to zero. Likewise, the number of times a certain channel (channels 111-118) has been viewed since a given point in time or event can be stored in frequency field 345.

A priority value associated with a channel (channels 111-118) can be stored in priority value 355, and an associated highlight value can be stored in highlight field 370. One or more times of day when a certain channel is viewed can be stored in time of day field 360. For example, if a channel is viewed every day at 10:00 AM to 11:00 AM and from 2:00 PM to 6:00 PM, these times could be stored in time of day field 360. A count may be associated with each time of day stored in time of day field 360 to facilitate hierarchical sorting of the values stored in time or day field 360. For example, if a channel (channels 111-118) is viewed more often at a first time of day than a second time of day, the first time of day could be listed first in time of day field 360, even if it occurs later in the day than the second time of day. Similarly, if a channel is on one or more certain days of the week or dates, these one or more days of the week or dates could be stored in date field 365. As with time of day field 360, a count could be included with each value to aid in sorting the values in date field 365. Each channel (channels 111-118) can have an associated content value, such as "action," "drama," "comedy," etc., stored in content field 375. If a channel has more than one associated content value, a count may be implemented with each value for use in sorting the multiple values of content field 375.

Figure 4:
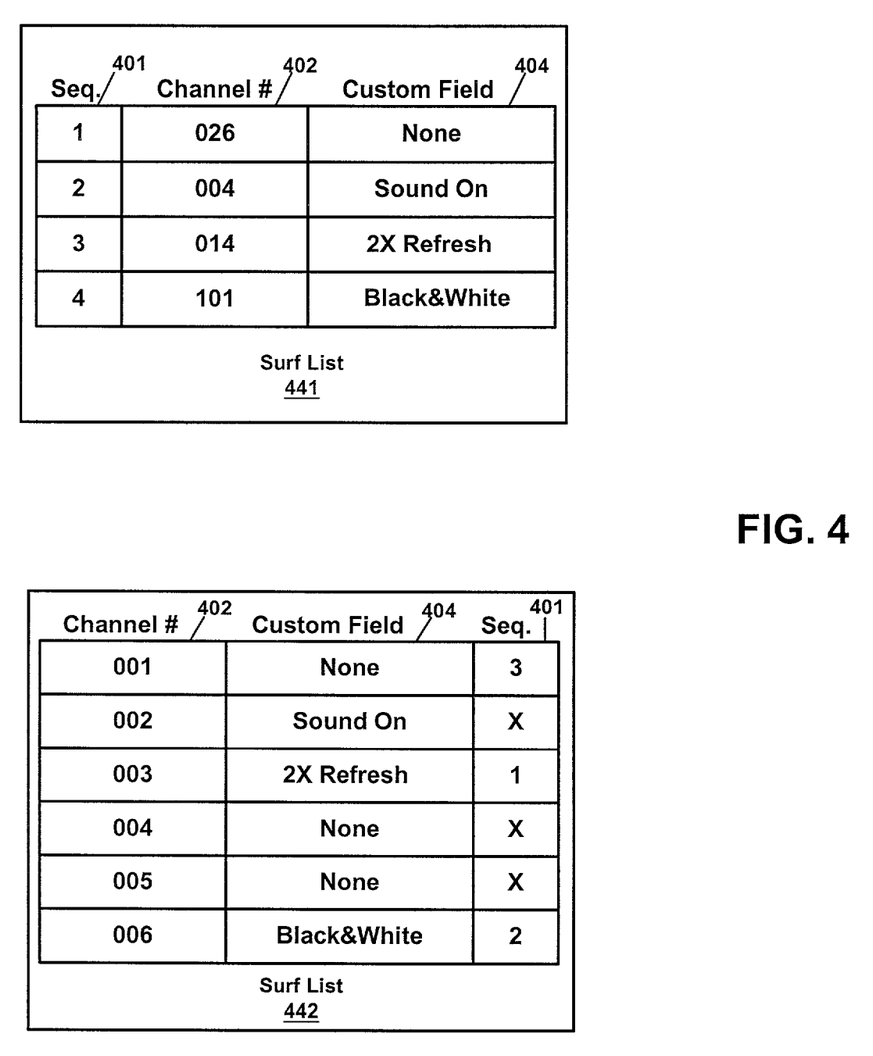
FIG. 4 is a block diagram illustrating various implementations of a "surf" list according to at least one embodiment of the present invention.

Referring to FIG. 4, two implementations of surf list 140 are illustrated according to at least one embodiment of the present invention. As discussed previously, surf list 140 (FIG. 1) is generated using viewing pattern 130 (FIG. 1) to select one or more channels 111-118 (FIG. 1) for inclusion in surf list 140. Surf lists 441, 442 include specific implementations of surf list 140. Accordingly, any reference herein to surf list 140 can also apply to surf lists 441, 442 unless otherwise noted. Surf lists 441, 442, in one embodiment, are implemented as one or more data structures stored in memory 122 (FIG. 1) or on a storage device associated with media processing system 120 (FIG. 1).

Surf list 441 includes sequence field 401, channel number field 402, and custom field 404 associated with each included channel (channels 111-118). If portions of the channels of surf list 441 are to be displayed sequentially, the order in which the included channels (channels 111-118) are displayed is indicated by sequence field 401. As illustrated in FIG. 4, channel number "026" is displayed first followed by channel numbers "004", "014", and "101". Alternately, if portions of the channels of surf list 441 are to be displayed simultaneously, the number in sequence field 401 can indicate the location in a grid of channel displays 161-164 (FIG. 1) on screen 160 (FIG. 1). For example, a 4 place grid on screen 160 could be a row of 4, a column of 4, a 2-by-2 matrix, and the like. In this case, channel number "026" would go in the first grid location, channel number "004" in the second, and so on.

Custom field 404, in one embodiment, is used to control certain properties of the associated channel (channels 111-118, FIG. 1) when displayed on screen 160 (FIG. 1). For example, custom field 404 associated with channel number "004" has a value of "sound on". In this case, the audio information associated with channel number "004" can be played when one or more portions of the channel (channels 111-118) associated with channel number "004" is displayed. Similarly, the channel associated with channel number "014" would have a refresh rate that is twice the default refresh rate, as indicated by the value "2× refresh" in custom field 404. The value of "black and white" in custom field 404 associated with channel number "101" could be used to cause the associated channel (channels 111-118) to be displayed in black and white rather than color. Although a number of custom display properties have been discussed, any appropriate custom display property may be implemented in the present invention. Note that the values in custom field 404 associated with each channel (channels 111-118) in surf list 441 may be determined using a variety of methods. For example, content field 375 of channel state 330 (FIG. 3) associated with a certain channel (channels 111-118) could be analyzed to determine a refresh rate. In this case, if the value of content field 375 is "action", the refresh rate could be set to "2× refresh" in the associated custom field 404.

Surf list 442 is similar in many ways to surf list 441. For example, both have sequence field 401, channel number field 402, and custom field 404. However, unlike surf list 441, in one embodiment, all of the channels (channels 111-118) received by media processing system 120 (FIG. 1) are listed in surf list 442. Since all channels are listed, the channels selected for display are indicated by a number in the associated sequence field 401 while those channels that are not to be displayed have an "X" in the associated sequence field 401. As discussed previously, the number in sequence field 401 can indicate the sequence portions of channels are displayed if the portions are displayed in sequence or the location in a grid if the portions are displayed simultaneously. The main difference between surf list 441 and surf list 441, as illustrated, is that surf list 441 contains only those channels (channels 111-118) to be displayed (i.e. those selected according to viewing pattern 140, FIG. 1), and with the channels in order. On the other hand, surf list 442 lists all channels ordered according to their associated channel number (channel number field 402). In this case, media processing system 120 likely has to search for each channel (channels 111-118) to be displayed. It will be appreciated that surf list 140 may be implemented in other forms without departing from the spirit or the scope of the present invention.

Figure 5:
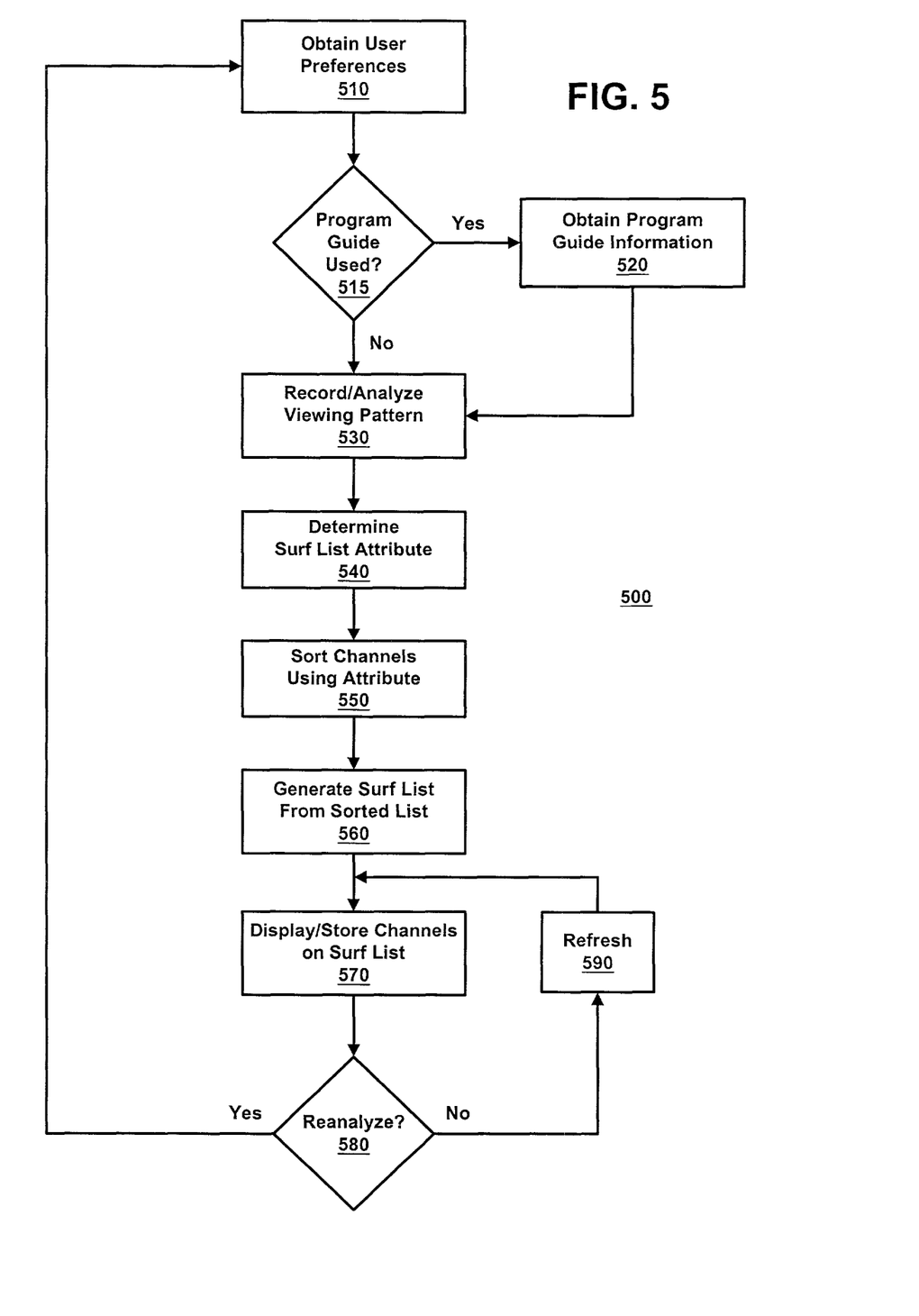
FIG. 5 is a flow diagram illustrating a method for displaying a plurality of media channels according to at least one embodiment of the present invention.

Referring next to FIG. 5, a method for improved display of a multiple media channels is illustrated according to at least one embodiment of the present invention. Display method 500 initiates in step 510, where a user's preferences are obtained by media processing system 120 (FIG. 1). In one embodiment, user preferences are obtained using setup menu 200, as discussed previously with reference to FIG. 2. In other embodiments, preferences are preset without user input. In this case, step 510 can be omitted. In embodiments where a plurality of users' preferences are available to media processing system 120, step 510 can also include media processing system 120 requesting a user identification, such as through user identification field 231 (FIG. 2) of setup menu 200 (FIG. 2).

In step 515, media processing system 120 determines if a program guide is to be used. In one embodiment, media processing system 120 checks yes box 227 and/or no box 228 (FIG. 2) associated with program guide field 226 of setup menu 200 (FIG. 2). If no program guide is to be used, method 200 continues to step 530. If it is determined that a program guide is to be used, the necessary information from program guide server 125 (FIG. 1) is obtained in step 520. In one embodiment, the location of program guide server 125 is indicated by location field 229 of setup menu 200. The necessary information retrieved from program guide server 125 in step 520 can include, but is not limited to, content information for each of channels 111-118 (FIG. 1), schedule information, priority values for each channel, highlight indicators, and the like.

In step 530, the user's viewing pattern is recorded as viewing pattern 130 (FIG. 1) and analyzed. As discussed previously in greater detail with reference to FIG. 3, one or more attributes of the user's viewing patterns is recorded in the corresponding field of viewing pattern 130. For example, if a user visits a certain channel (channels 111-118) ten times in a given time period, a value of ten can be recorded into frequency field 345 of channel state 330 (FIG. 3) associated with the certain channel. In another example, if it is determined that a number of channels 111-118 that are viewed by a user have a certain content (comedy, for example), a value associated with this certain content is stored in preferred content field 310 (FIG. 3). Values for some or all of fields 310-375 can be recorded in step 530 as discussed previously. In at least one embodiment, program guide information obtained in step 520 aids in generating viewing pattern 130.

In step 540, the attribute used to generate surf list 140 (FIG. 1) is determined. In one embodiment, the attribute is selected by the user using setup menu 200 (FIG. 2). For example, if the user selected most watched box 212 (FIG. 2), then the total time a channel has been viewed since a certain point in time or event is used as the attribute for generating surf list 140. In another embodiment, the attribute is selected by media processing system 120 independent of user input. For example, if it is determined (by analyzing preferred content field 310, FIG. 3, for example) that the user has a clear preference for dramatic shows, media processing system 120, in the absence of direction by the user or by overriding the preference indicated by a user, could use dramatic content as the attribute used to generate surf list 140. In at least one embodiment, content information or other information associated with one or more channels 111-118 can be obtained from information transmitted with the channel itself, or from an outside source, such as from program guide information for each of channels 111-118 obtained from program guide server 125 (FIG. 1).

In step 550, channels 111-118 (FIG. 1), in one embodiment are sorted according to the attribute determined in step 540 to generate a sorted list, where the sorted list is used in step 560 to generate surf list 140 (FIG. 1). In one embodiment, a most viewed method is used to sort channels 111-118. In this case, media processing system 120 (FIG. 1) sorts each channel 111-118 using time viewed field 350 of channel state 330 (FIG. 3) associated with each channel. Those of channels 111-118 having a higher total time viewed value are placed higher on a sorted list than those having a lower total time viewed value. Alternatively, in another embodiment, a least viewed method is used to sort channels 111-118. In this case, those channels having a lower total time viewed value are placed higher on a sorted list than those having a higher total time viewed value.

A most frequently viewed method is used to sort channels 111-118 in one embodiment. In this case, frequency field 345 of channel state 330 associated with each channel is used to sort channels 111-118. Those channels having a higher frequency value are placed higher on a sorted list than those having a lower frequency value. Alternatively, in another embodiment a least frequently viewed method can be used to sort channels 111-118, where those channels having lower frequency values are placed higher on a sorted list than those channels having higher frequency values.

In one embodiment, a channel number (channel number field 335, FIG. 3) is used to sort channels 111-118. In this case, channels 111-118 having a lower channel number are placed higher on a sorted list than channels having a higher channel number. In another embodiment, a priority selection method is used to sort channels 111-118. In this case, channels 111-118 having a higher priority value (priority field 355, FIG. 3) are placed higher in a sorted list than channels having a lower priority value. Similarly, a highlight selection method can be used to sort channels 111-118. In this case, channels 111-118 indicated as highlight channels (highlight field 370) are placed higher on a sorted list than those channels not indicated as highlight channels.

As discussed previously, time of day, the day of the week, and/or the date may be used to generate surf list 140 (FIG. 1). In one embodiment, time of day field 360 of channel state 330 (FIG. 3) associated with each channel 111-118 is used to sort channels 111-118. In this case, those channels that have time of day values closest to the value stored in time field 315 (FIG. 3) can be placed higher on a sorted list than those with time of day values further from the value stored in time field 315. A sorted list, in one embodiment, is generated using date field 335 (FIG. 3) associated with each channel 111-118 as the attribute used to generate surf list 140 (FIG. 1). In this case, channels having a value for the associated date field 335 that matches the value stored in date field 320 of viewing pattern 130 (FIG. 3) are placed in a list (also referred to herein as a "sorted" list for reasons of consistency with other embodiments).

Content, in one embodiment, can also be used as an attribute to generate surf list 140 (FIG. 1). In this case, content field 375 of channel state 330 (FIG. 3) for each of channels 111-118 can be compared to preferred content field 310 of viewing pattern 130 (FIG. 3). As discussed previously, preferred content field 310 may contain more than one value. In this case, those channels having a value stored in content field 375 that matches the "most" preferred content value in preferred content field 310 are placed higher on a sorted list than those channels having a value stored in content field 375 that matches a "less" preferred content value in preferred content field 310, and those channels without a matching value are placed at the bottom of the sorted list. Note that, in at least one embodiment, a combination of attributes is used to generate surf list 140. For example, channels 111-118 may be sorted by channel number (channel number field 335, FIG. 3) and then sorted by priority (priority field 355, FIG. 3). In another example, channels 111-118 can be sorted by content (content field 375, FIG. 3) and then sorted by the total time viewed (time viewed field, FIG. 3). It will be appreciated that other methods of sorting or arranging channels 111-118 without direct user input may be used without departing from the spirit or the scope of the present invention.

In step 560, surf list 140 (FIG. 1), in one embodiment, is generated by selecting a subset of channels 111-118 (FIG. 1) from the sorted list produced in step 550. The size of the subset, in one embodiment, is determined by the smaller of the number indicated in maximum channel box 205 of setup menu 200 (FIG. 2) or the maximum number of displays that display device 150 (FIG. 1) is capable of displaying. After determining the number of channels to be included in surf list 140, a subset is selected. In one embodiment, the selected channels are taken from the top of the sorted list generated in step 550. For example, if the sorted list has the most viewed channels (channels 111-118) at the top, and the user desires to preview the most viewed channels, a number of channels equal to the size of the subset are selected from the sorted list, starting at the top. In another embodiment, the subset of channels from the sorted list can be selected randomly from the sorted list. For example, if the sorted list contains those channels 111-118 whose date values (date field 365) match the date value selected as the attribute in step 540, any channel meets the criteria set by the user or by default, so the channels may be randomly chosen. After the subset of channels 111-118 is selected from the sorted list, the subset is placed in surf list 140 (FIG. 1), as well as any other information associated with the subset of channels 111-118, such as custom field 404 (FIG. 4) as discussed previously.

After surf list 140 (FIG. 1) is generated, portions of the channels 111-118 (FIG. 1) listed in surf list 140 are output to an output device in step 570. The output device can includes display device 150 (FIG. 1), storage device 180 (FIG. 1), speaker 170 (FIG. 1), and the like. As discussed previously, the portions of the channels in surf list 140 may be output simultaneously, or alternatively, in sequence. Recall that the portions of the channels of surf list 140 can include still images, audio clips, video clips, program guide information, and the like.

In step 580, it is determined if surf list 140 (FIG. 1) should be updated. In one embodiment, surf list 140 is to be updated after a predetermined time period, where the time period can be determined by a user, by media processing system 120, and the like. If it is not time to refresh surf list 140, the portions of the channels of surf list 140, in one embodiment, are updated or refreshed after a given time period in step 590, where the time period may be different for each channel of surf list 140 as discussed previously. If it is time to update surf list 140, steps 510-580 can be repeated.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

One of the preferred implementations of the invention is as sets of computer readable instructions resident in the random access memory of one or more processing systems configured generally as described in FIGS. 1-5. Until required by the processing system, the set of instructions may be stored in another computer readable memory, for example, in a hard disk drive or in a removable memory such as an optical disk for eventual use in a CD drive or DVD drive or a floppy disk for eventual use in a floppy disk drive. Further, the set of instructions can be stored in the memory of another image processing system and transmitted over a local area network or a wide area network, such as the Internet, where the transmitted signal could be a signal propagated through a medium such as an ISDN line, or the signal may be propagated through an air medium and received by a local satellite to be transferred to the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information. The preceding detailed description is, therefore, not to be taken in a limiting sense, and the scope of the present invention is defined only by the appended claims.

In the preceding detailed description of the figures, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   receiving at a media processing system of a display device, from a first type of media source, a first set of media channels, wherein the first type of media source is selected from a group consisting of a broadcast media source, a cable television source, an Internet source, and a stored media player source;
   receiving at the media processing system, from a second type of media source different than the first type of media source, a second set of media channels, wherein the second type of media source is selected from the group consisting of a broadcast source, a cable television source, an Internet source, and a stored media player source;
   obtaining content information associated with the media channels of at least one of the first set and the second set, the content information identifying a program genre for each of the media channels;
   selecting at the media processing system a third set of media channels for simultaneous display based on the content information and a set of used preferences, the third set comprising at least one media channel of the first set and at least one media channel of the second set;
   providing a portion of each media channel of at least a subset of at least two media channels of the third set for simultaneous display at a display device; and
   reverting from the set of user preferences, for selection of the third set, to a default set of preferences after a defined amount of time.

2. The method of claim 1, further comprising:
   providing the portion of each media channel of the subset for storage at a storage device.

3. The method of claim 1, further comprising:
   receiving user input indicating a media channel of one of the first set or second set for addition or deletion from the third set; and
   modifying the third set based on the user input.

4. The method of claim 1,
   wherein the defined amount of time is set by a user input.

5. The method of claim 1, wherein selecting the third set comprises selecting media channels identified by a viewing pattern as being more frequently viewed.

6. The method of claim 1, wherein determining user preferences comprises providing a user menu interface to facilitate input of user preferences by a user.

7. The method of claim 1, wherein the portion of each media channel comprises a still image and wherein the still image of some media channels of the subset are updated more frequently than other media channels of the subset based on at least one attribute associated with the media channels of the subset.

8. The method of claim 1, further comprising:
   selecting the media channels of the subset based on a display resolution of the display device.

9. The method of claim 8, wherein a number of media channels selected for the subset is based on the display resolution.

10. The method of claim 1, further comprising:
    prioritizing the media channels of the third set based on a prioritization attribute.

11. The method of claim 10, wherein the prioritization attribute is based on user preferences.

12. The method of claim 1, wherein obtaining content information comprises obtaining content information from a content source different from the first media source and the second media source.

13. The method of claim 12, wherein the content source is an Internet source.

14. The method of claim 1, wherein selecting the third set comprises selecting the third set independent of user input.

15. The method of claim 1, wherein selecting the third set comprises selecting the third set based on a prior use of a media processing system associated with the display device.

16. The method of claim 1, wherein the media processing system is a decoder box.

17. The method of claim 1, wherein the media processing system is a television receiver.

18. The method of claim 1, wherein the media processing system is a computer.

19. A method comprising:
    receiving at a media processing system of a display device, from a first type of media source, a first set of media channels, wherein the first type of media source is selected from a group consisting of a broadcast source, a cable television source, an Internet source, and a stored media player source;
    receiving at the media processing system of the display device, from a second type of media source different from the first type, a second set of media channels, wherein the second type of media source is selected from a group consisting of a broadcast source, a cable television source, an Internet source, and a stored media player source;

receiving at the media processing system of a display device, from a content source different than the first type of media source, content information associated with the first set, the content information identifying a program genre for each of the first set of media channels;

selecting at the media processing system of a display device a third set of media channels from the first set and the second set based on the content information and a set of user preferences;

providing a portion of each of the third set for simultaneous display at a display device; and reverting the set of user preferences, for selection of the third set, to a default set of preferences after a defined amount of time.

20. The method of claim 19, further comprising:
providing the portion of each media channel of the third set for storage at a storage device.

21. The method of claim 19, further comprising:
receiving user input indicating a media channel for addition or deletion from the third set; and
modifying the third set based on the user input.

22. The method of claim 19, further comprising:
receiving user input indicating the defined amount of time.

23. The method of claim 19, further comprising determining the user preferences based on a viewing pattern of a user.

24. The method of claim 23, wherein selecting the third set comprises selecting media channels identified by the viewing pattern as being more frequently viewed.

25. The method of claim 23, wherein determining user preferences comprises providing a user menu interface to facilitate input of user preferences by a user.

26. The method of claim 19, wherein the portion of each media channel comprises a still image and wherein the still image for some media channels of the third set are updated more frequently than other media channels of the third set based on at least one attribute associated with the media channels of the third set.

27. The method of claim 19, further comprising:
selecting a number of media channels for the third set based on a display resolution of the display device.

28. The method of claim 19, further comprising:
prioritizing the media channels of the third set based on a prioritization attribute.

29. The method of claim 28, wherein the prioritization attribute is based on user preferences.

30. The method of claim 19, wherein the content source is an Internet source.

31. The method of claim 19, wherein selecting the second set comprises selecting the third set independent of user input.

* * * * *

UNITED STATES PATENT AND TRADEMARK OFFICE
CERTIFICATE OF CORRECTION

PATENT NO. : 8,677,416 B2
APPLICATION NO. : 09/908039
DATED : March 18, 2014
INVENTOR(S) : Jitesh Arora

It is certified that error appears in the above-identified patent and that said Letters Patent is hereby corrected as shown below:

In the Claims

Column 13, Line 60, please change "selecting at the media processing system a third set of media channels for simultaneous display based on the content information and a set of used preferences," to --selecting at the media processing system a third set of media channels for simultaneous display based on the content information and a set of user preferences,--

Column 15, Line 23, please change "receiving user input indicating the defined amount of time." to --discontinuing use of the user preferences for selection of the third set subsequent to the defined amount of time.--

Signed and Sealed this
Second Day of September, 2014

Michelle K. Lee
*Deputy Director of the United States Patent and Trademark Office*